(12) United States Patent
Sung et al.

(10) Patent No.: US 8,788,544 B2
(45) Date of Patent: Jul. 22, 2014

(54) METHOD AND APPARATUS FOR MANAGING DATA

(75) Inventors: Ju-yun Sung, Yongin-si (KR); Ji-young Kwahk, Seongnam-si (KR); Sang-woong Hwang, Yongin-si (KR); Jee-sun Yoon, Seoul (KR); Soo-hong Park, Yongin-si (KR); Jin-guk Jeong, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 83 days.

(21) Appl. No.: 12/946,375

(22) Filed: Nov. 15, 2010

(65) Prior Publication Data

US 2011/0119313 A1 May 19, 2011

(30) Foreign Application Priority Data

Nov. 13, 2009 (KR) .................. 10-2009-0109447

(51) Int. Cl.
*G06F 17/30* (2006.01)

(52) U.S. Cl.
USPC .......................................... 707/803; 707/707

(58) Field of Classification Search
USPC .................................................. 707/707, 803
See application file for complete search history.

(56) References Cited

U.S. PATENT DOCUMENTS

| | | | |
|---|---|---|---|
| 6,243,713 B1 * | 6/2001 | Nelson et al. ..................... 1/1 |
| 7,149,788 B1 * | 12/2006 | Gundla et al. ............... 709/218 |
| 7,460,766 B2 * | 12/2008 | Heo et al. ..................... 386/239 |
| 7,734,922 B2 | 6/2010 | Lee et al. |
| 7,826,709 B2 | 11/2010 | Moriya et al. |
| 2002/0152267 A1 * | 10/2002 | Lennon ......................... 709/203 |
| 2004/0011190 A1 * | 1/2004 | Kawashima ...................... 84/645 |
| 2004/0100492 A1 * | 5/2004 | Mercs ........................... 345/744 |
| 2004/0172376 A1 * | 9/2004 | Kobori et al. ...................... 707/1 |
| 2004/0213092 A1 * | 10/2004 | Ueda et al. ................. 369/30.03 |
| 2005/0237832 A1 * | 10/2005 | Kim et al. ..................... 365/202 |
| 2007/0065107 A1 * | 3/2007 | Ryu et al. ......................... 386/95 |
| 2007/0156410 A1 * | 7/2007 | Stohr et al. .................... 704/275 |
| 2007/0255725 A1 * | 11/2007 | McCoach ....................... 707/10 |
| 2007/0288715 A1 * | 12/2007 | Boswell et al. ............... 711/164 |
| 2008/0010653 A1 * | 1/2008 | Ollikainen et al. ............. 725/25 |
| 2008/0052264 A1 * | 2/2008 | Nasu et al. ....................... 707/1 |
| 2008/0148313 A1 * | 6/2008 | Ozawa et al. ................... 725/39 |
| 2008/0166106 A1 * | 7/2008 | Ozawa et al. ................. 386/124 |
| 2008/0263252 A1 * | 10/2008 | Habuto et al. ................ 710/303 |
| 2008/0276158 A1 * | 11/2008 | Lim et al. ...................... 715/201 |
| 2008/0310825 A1 * | 12/2008 | Fang et al. .................... 386/124 |
| 2009/0162828 A1 * | 6/2009 | Strachan et al. .............. 434/350 |
| 2009/0285550 A1 * | 11/2009 | Yamada et al. ................. 386/95 |
| 2011/0269437 A1 * | 11/2011 | Marusi et al. .............. 455/414.1 |

FOREIGN PATENT DOCUMENTS

| | | |
|---|---|---|
| KR | 1020030088929 | 11/2003 |
| KR | 1020040022025 | 3/2004 |
| KR | 100606516 | 7/2006 |
| KR | 1020090013935 | 2/2009 |

OTHER PUBLICATIONS

European Search Report dated Jun. 28, 2013 issued in counterpart application No. 10830207.6-1958.

* cited by examiner

*Primary Examiner* — Cam-Linh Nguyen

(74) *Attorney, Agent, or Firm* — The Farrell Law Firm, P.C.

(57) ABSTRACT

Methods and apparatuses for managing data. The method includes obtaining first data including a plurality of components, determining at least one component to be reproduced by an external device from among the plurality of components, based on metadata about the external device, and generating second data using the at least one component from the first data.

17 Claims, 7 Drawing Sheets

FIG. 3

| DEVICE ID (301) | DATA TYPE (302) |
|---|---|
| 0001 (310) | mp3, wav, mp4 |
| 0002 (320) | mp3, wav, mp4<br>mpg, ALI<br>Text, n<br>jpg |
| 0003 (330) | mp3, wav, mp4<br>txt<br>jpg |

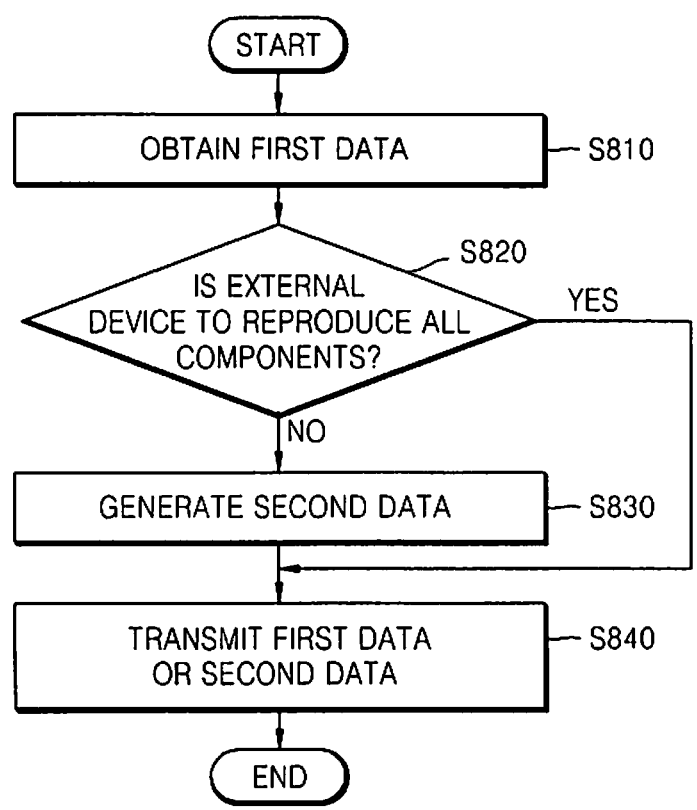

METHOD AND APPARATUS FOR MANAGING DATA

PRIORITY

This application claims priority under 35 U.S.C. §119(a) to Korean Patent Application No. 10-2009-0109447, which was filed in the Korean Intellectual Property Office on Nov. 13, 2009, the entire disclosure of which is hereby incorporated by reference.

BACKGROUND OF THE INVENTION

1. Field of the Invention

The present invention relates generally to methods and apparatuses for managing data, and more particularly, to methods and apparatuses for managing content in which new data is generated by extracting components that are to be reproduced by an external device, from among received data.

2. Description of the Related Art

With the rapid development in the Information Technology (IT) field, various information is available to users of Consumer Electronic (CE) devices. In particular, the types of information vary and thus, multi-component information providing two or more components is generalized, as previously, only two components, i.e., a video component or an audio component, could be independently obtained.

In addition, various types of CE devices have been released. Although the newer CE devices are capable of simultaneously providing multiple functions, it is still difficult to reproduce various types of components due to the characteristics of the CE device focusing on mobility.

SUMMARY OF THE INVENTION

Accordingly, the present invention has been designed to address the above-mentioned problems occurring in the prior art, and the present invention provide methods and apparatuses for managing data, wherein components to be reproduced by an external device are extracted from received data to generate new data.

According to an aspect of the present invention, a method of managing data is provided. The method includes obtaining first data including a plurality of components; determining at least one component to be reproduced by an external device from among the plurality of components, based on metadata about the external device; and generating second data by extracting the at least one component from the first data.

According to another aspect of the present invention, a component managing apparatus is provided. The apparatus comprises an obtaining unit for obtaining first data including a plurality of components; a component determining unit for determining at least one component to be reproduced by an external device from among the plurality of components, based on metadata about the external device; and a generating unit for generating second data by extracting the at least one component from the first data, when the external device is to reproduce only some of the plurality of components.

BRIEF DESCRIPTION OF THE DRAWINGS

The above and other aspects, features, and advantages of certain embodiments of the present invention will become more apparent the following detailed description with reference to the attached drawings in which:

FIG. 3 illustrates an example of data type information according to an embodiment of the present invention;

FIG. 8 is a flowchart illustrating a method of providing components according to an embodiment of the present invention.

DETAILED DESCRIPTION OF EMBODIMENTS OF THE INVENTION

Figure 1:
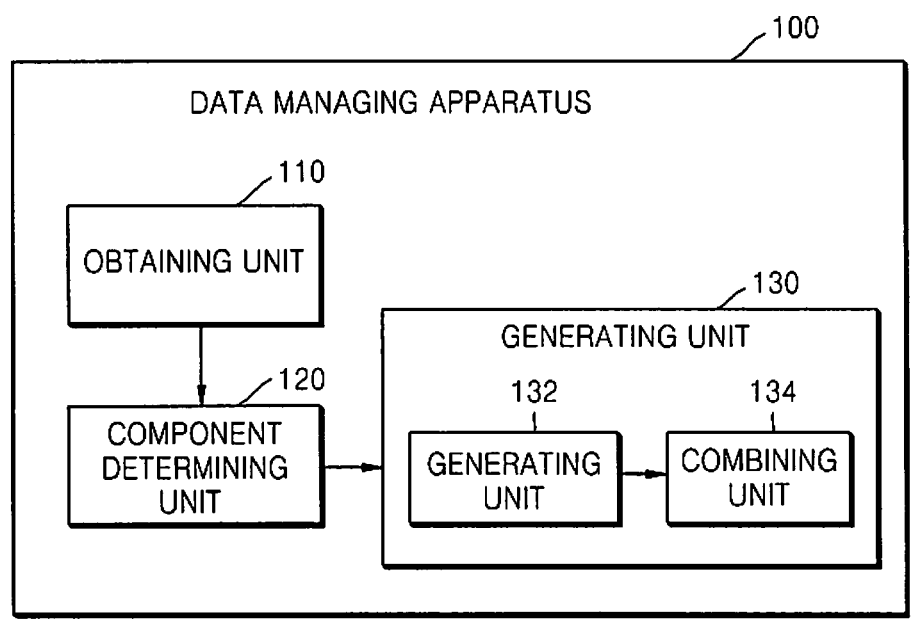
FIG. 1 is a block diagram illustrating a data managing apparatus according to an embodiment of the present invention.

Hereinafter, various embodiments of present invention will be described more fully with reference to the accompanying drawings. In the following description, the same elements will be designated by the same reference numerals although they are shown in different drawings. Further, a detailed description of known functions and configurations incorporated herein will be omitted when it may obscure the subject matter of the present invention.

FIG. 1 is a block diagram illustrating a data managing apparatus 100 according to an embodiment of the present invention.

Referring to FIG. 1, the data managing apparatus 100 includes an obtaining unit 110, a component determining unit 120, and a generating unit 130. The obtaining unit 110 obtains first data including a plurality of components. The first data may be multi media data generated by combining various components, such as a video, audio, text, etc. The first data may be a file type or a stream type such as broadcasting data.

For example, the first data may be a movie file including a component providing video, a component providing audio, a component providing subtitles, and a component providing still images. When the user reproduces the first data, the plurality of components included in the first data are reproduced at the same time (or sequentially). Time information indicating a time period of each component to be reproduced may be included in the first data, and the components may be reproduced in synchronization with one another based on the time information.

The component determining unit 120 determines at least one component to be reproduced by an external device from among the plurality of components, based on metadata about the external device.

Metadata may include capability information related to the external device, such as types of data that may be reproduced by the external device, current resource status information of the external device, codec information supported by the external device, type information of a video component supported by the external device, and type information of an audio component supported by the external device. In addition, the metadata may include data related to the external device, such as a product number for distinguishing the external device and/or a device name designated by the user. When at least two external devices are connected or registered to the data managing apparatus 100, the metadata may include information related to each of the external devices.

The component determining unit 120 determines at least one component to be reproduced by the external device based on the metadata about the external device. For example, when the external device is capable of reproducing only MP3-format data, the component determining unit 120 determines only an audio component among the plurality of components as a component to be reproduced by the external device. Alternatively, when the external device is capable of reproducing only text file type data, the component determining unit 120 may determine only a text component among the plurality of components included in the first data as a component to be reproduced by the external device.

The component determining unit 120 may determine a type of second data based on user preference information, i.e., based on information that the user mainly reproduces a predetermined type of data in each of a plurality of the external devices.

For example, a user who possesses both a Portable Media Player (PMP) and a MP3 player and reproduces data including a video component, mainly using the PMP, and reproduces data including an audio component, mainly using the MP3 player. Although the MP3 player may reproduce both data including an audio component and data including a video component, based on the previous use of the devices, i.e., the user preference information, the component determining unit 120 determines only an audio component among the plurality of components included in the first data as a component to be reproduced by the MP3 player.

Additionally, the user preference information may include information about a type of data that is frequently reproduced by the user in a predetermined environment. More specifically, the user preference information may include mapping information between a predetermined environment and a data type preferred by the user in the predetermined environment.

When an external device is used by at least two users, user preference information may exist for each of the users.

When all components included in the first data are determined to be reproduced in the external device, the generating unit 130 may not have to generate second data. However, whenever fewer than all of the components included in the first data are determined to be reproduced by the external device, the generating unit 130 extracts at least one component from the first data to generate second data.

As illustrated in FIG. 1, the generating unit 130 includes an extracting unit 132 and a combination unit 134. The extracting unit 132 extracts at least one component from the first data, based on a result of the determination of the component determining unit 120. That is, the extracting unit 132 selectively extracts components to be reproduced by the external device from among the plurality of components included in the first data.

The combination unit 134 combines the at least one extracted component to generate second data. The combination unit 134 generates time information indicating a time period for the components included in the second data to be reproduced and adds the generated time information to the second data so as to allow a plurality of components to be reproduced in synchronization with one another.

The combination unit 134 may generate second data by combining the at least one component extracted from first data and a new component. For example, when the extracting unit 132 has extracted a video component and an audio component from the first data, the data managing apparatus 100 may obtain a text component related to the video component or the audio component through a search engine although the text component is not included in the first data. Alternatively, the combination unit 134 may generate second data by combining a video component and an audio component extracted from the first data and a text component obtained from the outside. That is, not all components to be included in the second data must be extracted from the first data.

The generating unit 130 may include a conversion unit for converting the at least one extracted component to be suitable to the external device. For example, when the extracting unit 132 extracts a video component having a 1920*1080 resolution from the first data and the external device is capable of reproducing a video component having a 1920*1080 resolution, the converting unit does not have to convert the extracted video component. However, if the external device is only capable of reproducing a video component having a 1024*768 resolution, the converting unit converts the video component having a 1920*1080 to be suitable for resolution of the external device.

The data managing apparatus 100 may further include a transmitting unit (not shown), which transmits the generated second data or the first data to the external device.

More specifically, when it is determined that the external device is to reproduce all components included in the first data, the transmitting unit transmits the first data to the external device. However, when it is determined that the external device is to reproduce only some of the components included in the first data, the transmitting unit extracts components to be reproduced by the external device and transmits second data generated by combining the extracted components.

Multiple external devices may be connected to the data managing apparatus 100. In this case, the transmitting unit may transmit the generated second data to all connected devices or may transmit the second data to only one of the plurality of external devices based on a priority. The priority may be automatically determined according to predetermined conditions (e.g., the number of times the user uses the external device, capability information of the external devices, etc.) or may be determined by a user input.

Figure 2:
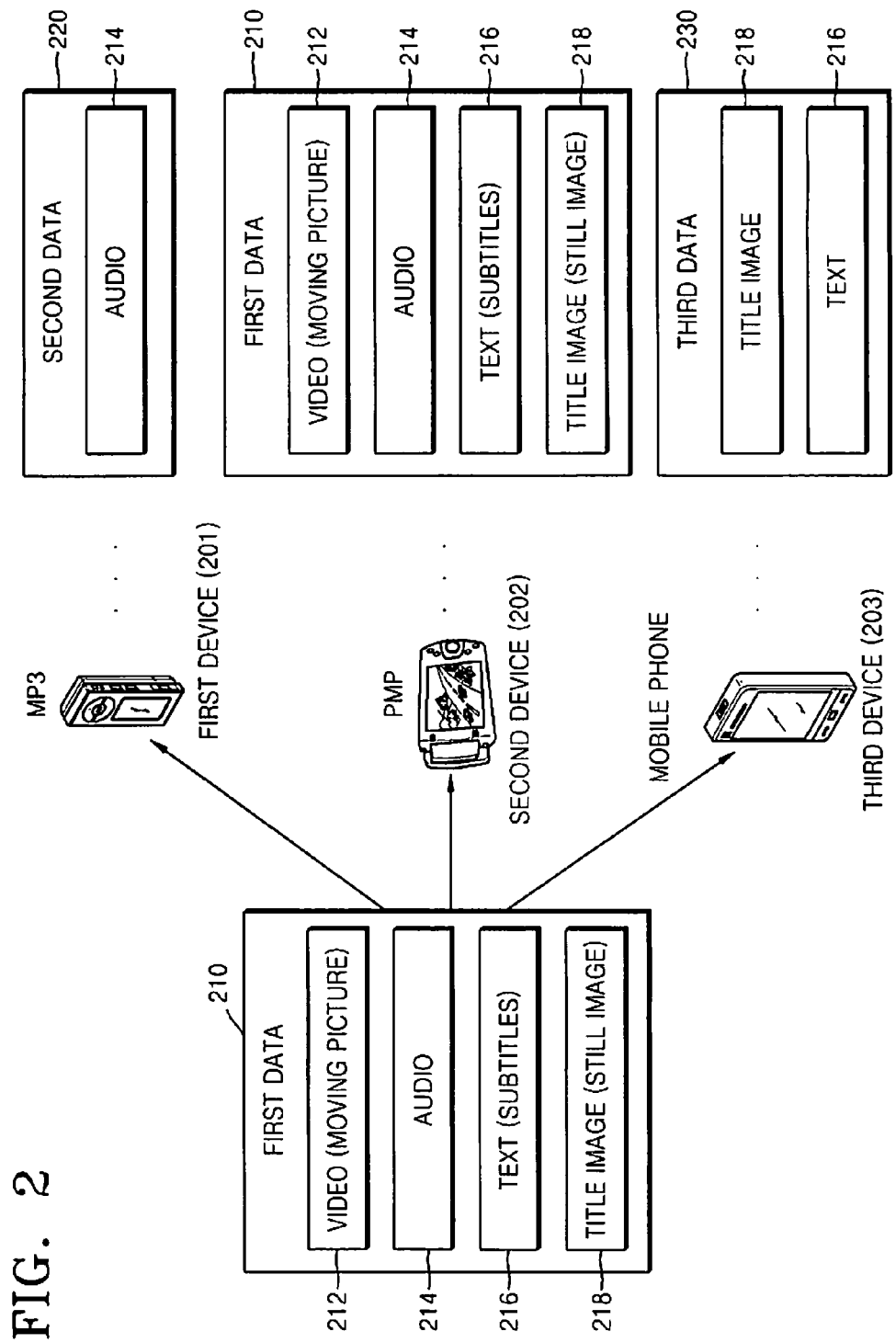
FIG. 2 illustrates an operation of a data managing apparatus according to an embodiment of the present invention.

FIG. 2 illustrates an operation of a data managing apparatus 100 according to an embodiment of the present invention.

Referring to FIG. 2, a first device 201 (an MP3 player), a second device 202 (a PMP), and a third device 203 (a mobile phone) are connected to the data managing apparatus 100. As described above, the data managing apparatus 100 converts a first data 210 including a video component 212, an audio component 214, a text component 216, and an image component 218, to second or third data that includes only components that can be reproduced by the first device 201, the second device 202, and the third device 203, respectively.

More specifically, the obtaining unit 110 obtains the first data 210 including the video component 212, the audio component 214, the text component 216, and the image component 218.

It is assumed herein, that the first device 201 (the MP3 player) is capable of reproducing data including only the audio component 214. Therefore, the first device 201 cannot reproduce the first data 210.

Accordingly, in order to provide data to the first device 201, the generating unit 130 extracts the audio component 214 from the first data 210, and generates second data 220 using the extracted audio component 214. Thereafter, the transmitting unit transmits the second data 220 to the first device 201.

It is assumed herein that the second device 202 (the PMP) is capable of reproducing data including all of the components, i.e., the video component 212, the audio component 214, the text component 216, and the image component 218. Therefore, the second device 202 is capable of reproducing the first data 210.

Accordingly, in order to provide data to the second device 202, the transmitting unit transmits the first data 210, as it is, to the second device 202. That is, the generating unit 130 does not extract any components from the first data 210 or generate new data.

It is also assumed that the third device 203 (the mobile phone) is capable of reproducing only the text component 216 and the image component 218. Therefore, the third device 203, like the first device 201, cannot reproduce the first data 210.

Accordingly, in order to provide data to the third device 203, the generating unit 130 extracts the text component 216 and the image component 218 from the first data 210, and combines the text component 216 and the image component 218 to generate third data 230. Thereafter, the transmitting unit transmits the third data 230 to the third device 203.

FIG. 3 illustrates an example of data type information 300 according to an embodiment of the present invention.

Referring to FIG. 3, the data type information 300 includes mapping information between an external device registered or connected to the data managing apparatus 100 and a type of data that can be reproduced by the external device. Additionally, the data type information 300 includes a device IDentification (ID) item 301 and a data type item 302. The device ID item 301 is identification information for identifying an external device.

For example, in the device ID item 301 of the data type information 300 illustrated in FIG. 3, a serial number of the external device may be used as the device ID item 301. Alternatively, a brief explanation about the device may be further included in the device ID item 301 for easy identification of the device for the user.

The data type item 302 indicates types of data that can be reproduced by the external device corresponding to the device ID item 301. The data type item 302 may be any data that indicates a type of data that can be reproduced by the external device. In FIG. 3, data types are indicated using file extensions.

Referring to FIG. 3, an external device 310 with a device ID "0001" is capable of reproducing data having extensions such as mp3, wav, and mp4. An external device 330 having a device ID "0003" is capable of reproducing data having extensions such as mp3, wav, mp4, txt, and jpg.

Figure 4:
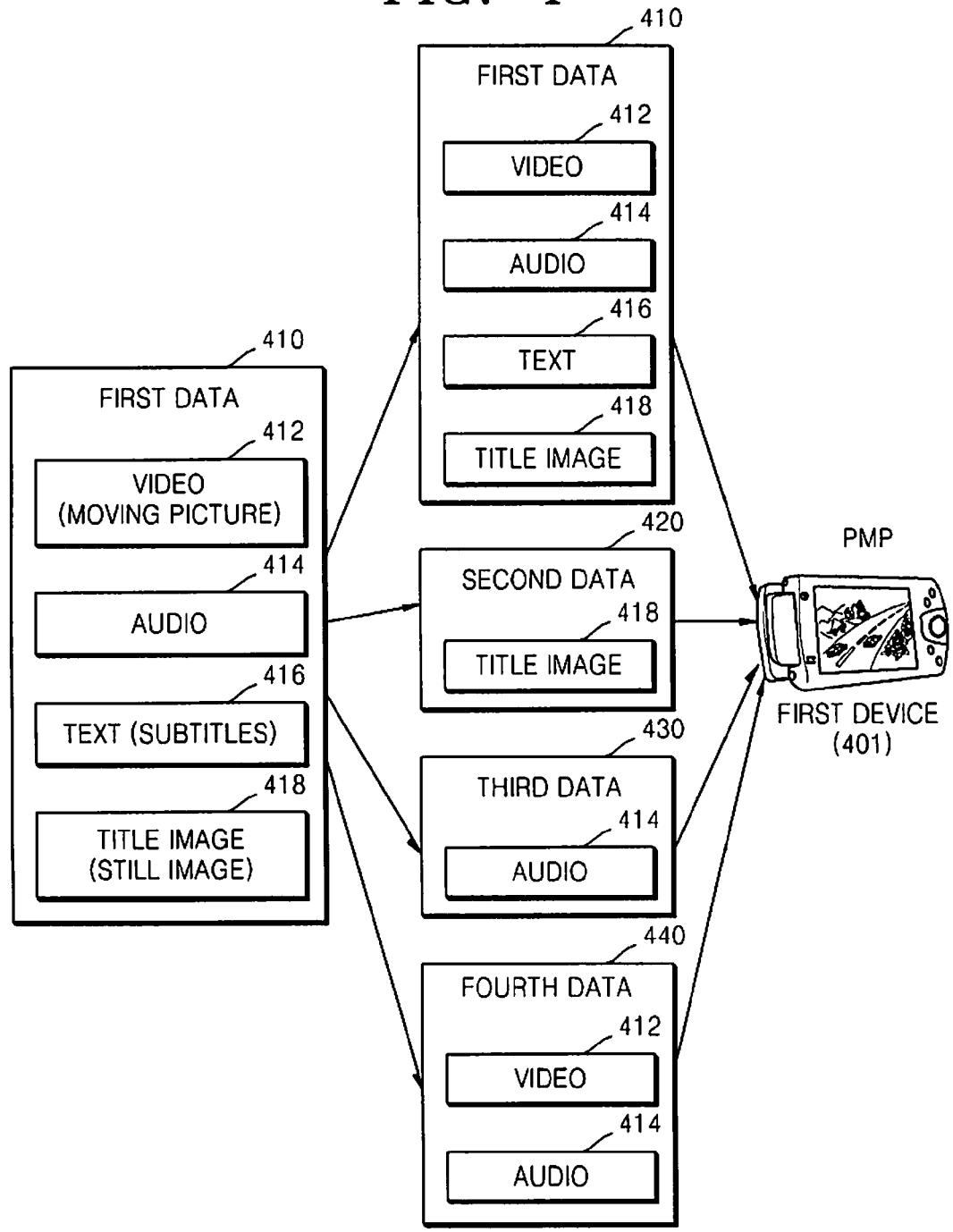
FIG. 4 illustrates an operation of a data managing apparatus according to an embodiment of the present invention.

FIG. 4 illustrates another example of an operation of a data managing apparatus 100 according to an embodiment of the present invention.

Referring to FIG. 4, the obtaining unit 110 obtains first data 410 including a video component 412, an audio component 414, a text component 416, and an image component 418. For convenience of description, the video component 412 is assumed to be a video component of a lecture, the audio component 414 is assumed to be an audio component of the lecture, and the text component 416 and the image component 418 are assumed to be a component including lecture materials.

Although the first device 410 is capable of reproducing all of data components, i.e., the video component 412, the audio component 414, the text component 416, and the image component 418, in FIG. 4, the component determining unit 120 determines a component to be reproduced by the external device based on user preference information.

Table 1 below shows an example of user preference information.

TABLE 1

|                 | Room | Streets | Lecture room | Library |
|-----------------|------|---------|--------------|---------|
| Video component | 10   | 1       | 1            | 1       |
| Audio component | 10   | 20      | 1            | 1       |
| Text component  | 10   | 3       | 20           | 1       |
| Image component | 10   | 3       | 20           | 20      |

The user preference information shown in Table 1 indicates component use history according to a place at which the user was located. Referring to Table 1, in the room, the user has reproduced all the types of components frequently, and on the streets, the user has frequently reproduced data including an audio component. In the lecture room, the user has reproduced data including a text component and an image component. In the library, the user has frequently reproduced data including an image component.

Accordingly, based on the information in Table 1, when the user requests reproduction of the first data 410, when the user is in the room, the first data 410 is transmitted, as it is, to the first device 410.

However, when the user requests reproduction of the first data 410, when the user is in the library, the generating unit 130 generates the second data 420 including only the image component 418, and the transmitting unit transmits the second data 420 to the first device 410.

When the user requests reproduction of the first data 410, while the user is moving, the generating unit 130 generates the third data 430 including only the audio component 414, and the transmitting unit transmits the third data 430 to the first device 410.

When the user requests reproduction of the first data 410, when the user is in the lecture room, the generating unit 130 generates fourth data 440 including only the text component 416 and the image component 418, and the transmitting unit transmits the fourth data 440 to the first device 410.

In FIG. 4, the component determining unit 120 uses user preference information in determining a type of data to be transmitted to the first device 410. Alternatively, types of data to be transmitted to the first device 410 may be provided as a list to the user so that the user may select a desired data type or types to be transmitted to the first device 410.

Figure 5:
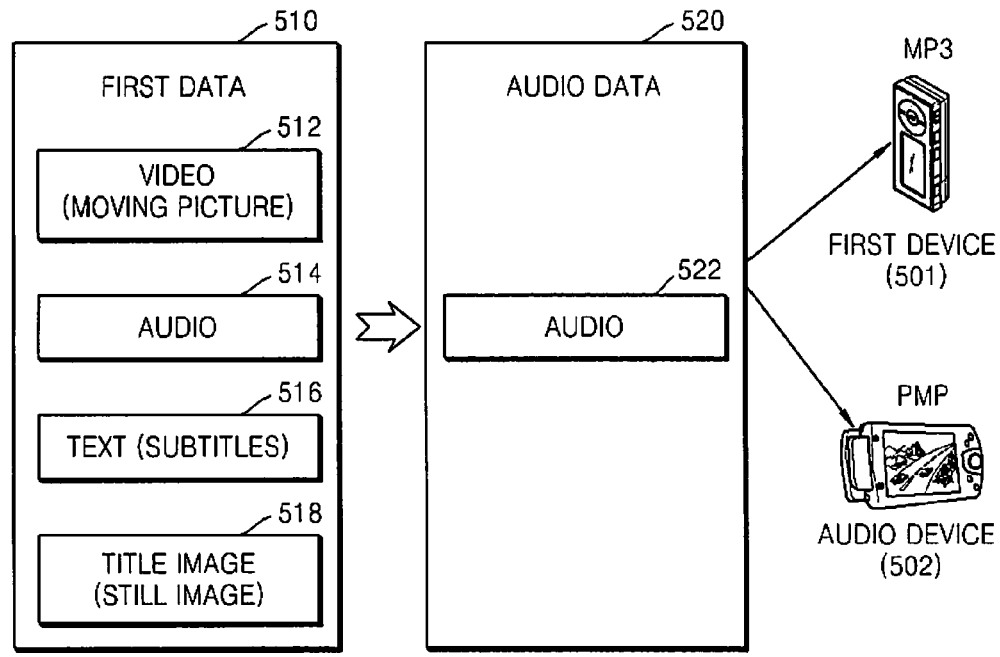
FIG. 5 illustrates an operation of a transmitting unit according to an embodiment of the present invention.

FIG. 5 illustrates an operation of a transmitting unit according to an embodiment of the present invention.

Referring to FIG. 5, the obtaining unit 110 obtains first data 510 including a video component 512, an audio component 514, a text component 516, and an image component 518. The generating unit 130 generates second data 520 including only an audio component 522. The transmitting unit may transmit the second data 520 to both the first device 501 and the second device 502, or to one of the first device 501 and the second device 502, based on a priority. The priority may be determined on the number of times the same type of data as the second data 520 has been reproduced by each of the first device 501 and the second device 502. Alternatively, a device to which the second data 520 is to be transmitted may be determined by asking the user which of the first device 501 and the second device 502 the second data 520 should receive the second data 520.

Figure 6:
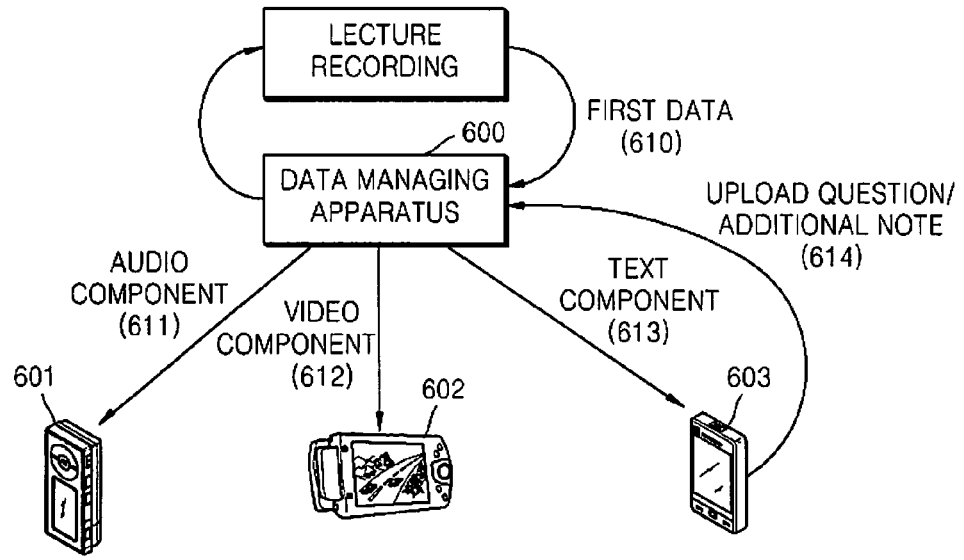
FIG. 6 illustrates an operation of a data managing apparatus according to an embodiment of the present invention.

FIG. 6 illustrates an operation of a data managing apparatus 600 according to another embodiment of the present invention.

Referring to FIG. 6, a user records a lecture to generate first data 610 including a video component of recorded lecture scenes, an audio component of recorded lecture sounds, and a text component of lecture materials.

The data managing apparatus 600 may generate first data 610 itself or receive the first data 610 from a server via a network connection.

The data managing apparatus 600 separates the first data 610 according to the external devices. That is, the data managing apparatus 600 extracts some components included in the first data 610 and transmits them to the external device, respectively. For example, a video component 612 is extracted from the first data 610 and transmitted to a PMP 602, and an audio component 611 is extracted from the first data 610 and transmitted to an MP3 player 601, and a text component 613 is extracted from the first data 610 and is transmitted to a mobile phone 603.

The user may reproduce, modify or add a component in each of the external devices. For example, when the user wants to see the video component 612 while reproducing the text component 613 via the mobile phone 603, the user generates the request as text data 614, which the user transmits to the data managing apparatus 600 or to the server to modify the first data so as to include the video component 612.

Figure 7:
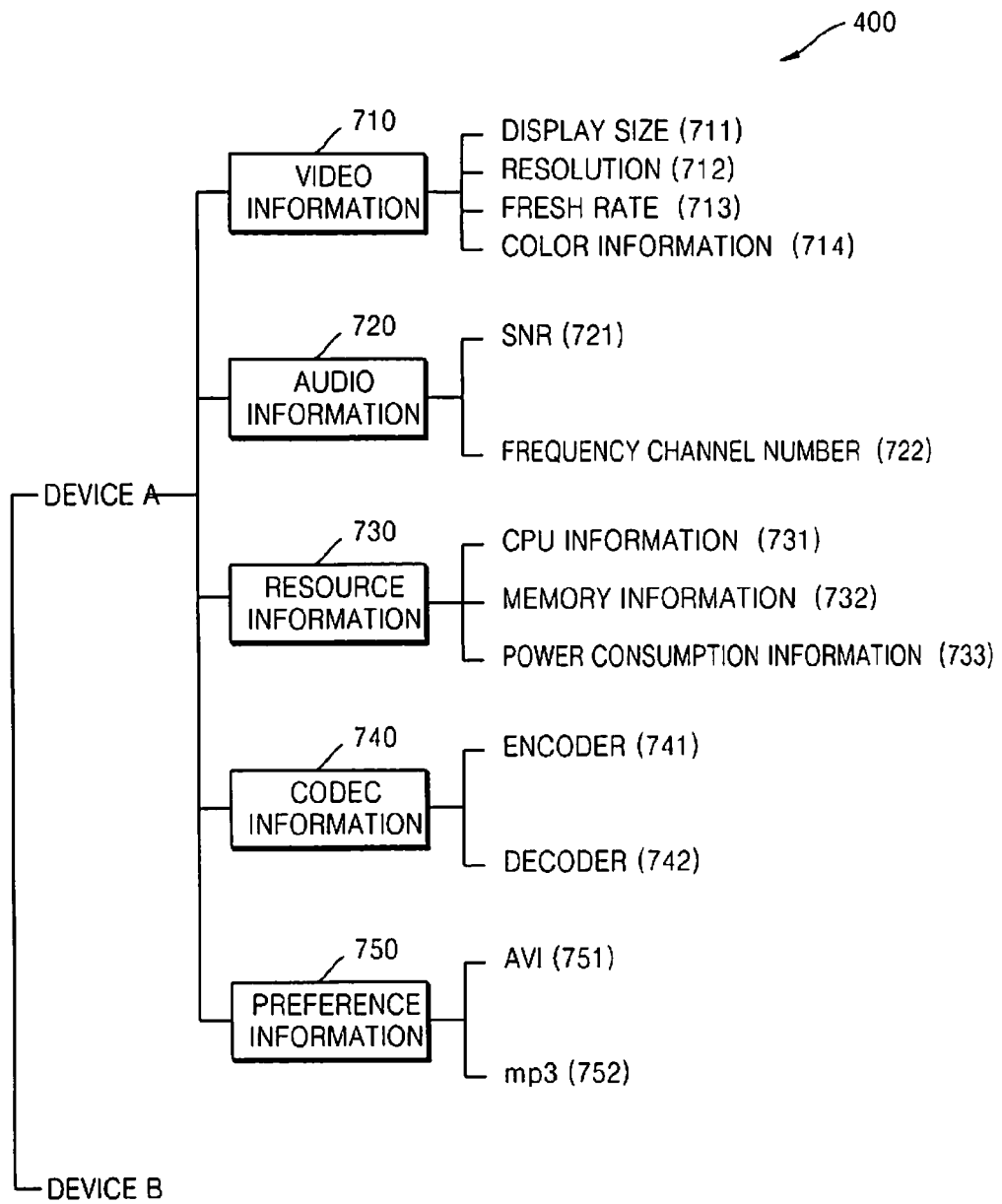
FIG. 7 illustrates device metadata according to an embodiment of the present invention.

FIG. 7 illustrates an example of device metadata 700 according to an embodiment of the present invention.

Referring to FIG. 7, the device metadata 700 includes video information 710, audio information 720, resource information 730, codec information 740, and preference information 750. The video information 710 includes display size information 711, resolution 712, fresh rate 713, and color information 714, the audio type information 720 includes signal-to-noise ratio (SNR) 721 and frequency channel number 722, and the resource information 730 includes CPU information 731, memory information 732, and power consumption information 733.

The codec information 740 identifies codecs supported by corresponding devices. The codec information 740 includes an encoder type information 741 and a decoder type information 742 supported by corresponding devices. The encoder type information 741 and the decoder type information 742 may include video codec information, audio codec information, image codec information, container information, etc., used by an encoder or a decoder.

The preference information 750 indicates types of data preferred by the user to be reproduced using the external devices. The preference information 750 may be determined based on types of data that have been reproduced by external devices in the past or by a user input. The preference information 750 may be included in metadata about the external devices, as illustrated in FIG. 7, or may be included in user metadata.

Alternatively, the data managing apparatus 600 may also function as an external device at the same time. For example, when the data managing apparatus 600 has received first data 610 but the type of the first data 610 is not preferred by the user or the first data 610 cannot be reproduced by the data managing apparatus 600, some of the components are extracted from the first data 610 to generate second data.

FIG. 8 is a flowchart illustrating a method of providing a component according to an embodiment of the present invention.

Referring to FIG. 8, in step S810, first data including a plurality of components is obtained. In step S820, it is determined whether all of the plurality of components are to be reproduced in an external device, based on device metadata including information about the external device. Additionally, a component to be reproduced by the external device may be determined based on user preference information including information about a data type desired by the user.

When only some of the plurality of components are to be reproduced by the external device, at least one component to be reproduced by the external device is extracted from the first data to generate second data in step S830, and then the second data is transmitted in step S840.

However, when all of the plurality of components are to be reproduced by the external device, the first data is transmitted to the external device in step S840.

In addition to the description provided above, certain embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media (e.g., transmission through the Internet).

While the present invention has been particularly shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of managing data in a component managing apparatus, the method comprising:
   obtaining first data, wherein the first data is configured to include a plurality of components, each of the plurality of components having a different data type;
   determining, by a processor, at least one component to be reproduced by an external device from among the plurality of components, based on metadata about the external device; and
   generating second data comprising the determined at least one component extracted from the first data.

2. The method of claim 1, further comprising:
   determining whether the external device can reproduce the first data including the plurality of components, based on the metadata about the external device;
   when the external device can reproduce the first data including the plurality of components, transmitting the first data to the external device; and
   when the external device cannot reproduce the first data including the plurality of components, transmitting the second data to the external device.

3. The method of claim 1, wherein generating the second data comprises:
   extracting the at least one component from the first data; and
   generating the second by combining the at least one extracted component.

4. The method of claim 1, wherein the metadata includes data type information indicating a type of data that can be reproduced by the external device.

5. The method of claim 1, wherein the at least one component is determined based on the metadata about the external device and user preference information including information about a type of data preferred in the external device by a user.

6. The method of claim 1, further comprising converting the at least one component to be suitable for the external device based on the metadata about the external device.

7. The method of claim 1, further comprising selecting the external device from among a plurality of external devices based on a priority.

8. A component managing apparatus comprising:
- an obtaining unit configured to obtain first data, wherein the first data is configured to include a plurality of components, each of the plurality of components having a different data type;
- a processor configured to control a component determining unit configured to determine at least one component to be reproduced by an external device from among the plurality of components, based on metadata about the external device; and
- a generating unit configured to generate second data comprising the determined at least one component extracted from the first data.

9. The component managing apparatus of claim 8, further comprising:
- a transmitting unit configured to transmit the first data to the external device, when the external device can reproduce the first data including the plurality of components, and transmit the second data to the external device, when the external device cannot reproduce the first data including the plurality of components.

10. The component managing apparatus of claim 9, wherein the generating unit comprises:
- an extracting unit configured to extract the at least one component from the first data; and
- a combining unit configured to combine the second data by combining the at least one component extracted from the first data.

11. The component managing apparatus of claim 8, wherein the metadata about the external device comprises data type information indicating a type of data that can be reproduced by the external device.

12. The component managing apparatus of claim 11, wherein the generating unit comprises a conversion unit for converting the at least one component to be suitable for the external device based on the metadata about the external device.

13. The component managing apparatus of claim 8, wherein the component determining unit determines the at least one component to be reproduced by the external device from among the plurality of components, based on the metadata about the external device and based on user preference information including information about a type of data preferred in the external device by a user.

14. The component managing apparatus of claim 8, wherein the component determining unit selects the external device from a plurality of external devices based on a priority.

15. A non-transitory computer readable recording medium having embodied thereon a program for executing the method of:
- obtaining first data, wherein the first data is configured to include a plurality of components, each of the plurality of components having a different data type;
- determining at least one component to be reproduced by an external device from among the plurality of components, based on metadata about the external device; and
- generating second data comprising the determined at least one component extracted from the first data.

16. A component managing server, the server comprising:
- an obtaining unit for obtaining a first data, wherein the first data is configured to include a plurality of components, each of the plurality of components having a different data type;
- a processor configured to control a component determining unit for determining at least one component, to be reproduced by an external device, from among the plurality of components, based on metadata about the external device;
- a generating unit for generating a second data comprising the determined at least one component extracted from the first data; and
- a transmitting unit for transmitting the generated second data, to the external device.

17. The method of claim 1, wherein the second data includes further data not included in the first data, the further data being obtained from an external source.

* * * * *